US011403602B2

(12) United States Patent
Gonen et al.

(10) Patent No.: US 11,403,602 B2
(45) Date of Patent: Aug. 2, 2022

(54) INCENTIVE-BASED WASTE REDUCTION SYSTEM AND METHOD THEREOF

(71) Applicant: RTS RecycleBank LLC, New York, NY (US)

(72) Inventors: Ron Gonen, New York, NY (US); Morley Ivers, Toronto (CA); David Wigder, Bronx, NY (US); Paul T. Winn, Jr., Norwalk, CT (US)

(73) Assignee: RTS RECYCLEBANK, LLC, New York, NY (US)

( * ) Notice: Subject to any disclaimer, the term of this patent is extended or adjusted under 35 U.S.C. 154(b) by 0 days.

(21) Appl. No.: 16/512,611

(22) Filed: Jul. 16, 2019

(65) Prior Publication Data

US 2020/0082355 A1 Mar. 12, 2020

Related U.S. Application Data

(63) Continuation-in-part of application No. 12/435,619, filed on May 5, 2009, now Pat. No. 10,354,474,
(Continued)

(51) Int. Cl.
*G06Q 30/00* (2012.01)
*G06Q 10/00* (2012.01)
(Continued)

(52) U.S. Cl.
CPC .............. *G06Q 10/30* (2013.01); *B65F 1/14* (2013.01); *B65F 3/00* (2013.01); *G06Q 30/0215* (2013.01);
(Continued)

(58) Field of Classification Search
CPC .... G06Q 10/30; G06Q 30/0215; G06Q 50/26; B65F 1/14; B65F 3/00; B65F 2210/184
(Continued)

(56) References Cited

U.S. PATENT DOCUMENTS

| 4,248,334 A | 2/1981 | Hanley et al. |
| 4,949,528 A | 8/1990 | Palik |

(Continued)

FOREIGN PATENT DOCUMENTS

| JP | 2001195496 A | 7/2001 |
| JP | 2001312551 A | 11/2001 |

(Continued)

OTHER PUBLICATIONS

Savage, J, City Recycling Participation the Highest it's been Under New Program: Corpus Christi Residents Catch on to City's Profitable Recycling Program, Corpus Christi Caller-Times, Sep. 3, 2011 (Year: 2011).*

(Continued)

*Primary Examiner* — Matthew L Hamilton
(74) *Attorney, Agent, or Firm* — Reed Smith LLP

(57) ABSTRACT

An incentive-based waste reduction system and method thereof are disclosed herein. In accordance with one embodiment of the present invention, an incentive-based waste reduction system comprises a collection means comprising at least a load-determining device, the collection means for obtaining a quantifiable measure of waste material from an entity, a value associated with the quantifiable measure of waste material, an adjustment factor for adjusting the value associated with the quantifiable measure of waste material, determined from an algorithm, the algorithm taking as an input at least a predetermined factor, a credit value associated with at least a quantifiable measure of deposited waste material, and a reward value associated with the credit value. Information about the waste material is transmitted to a host server which performs actions based on the received information, including reconfiguring a deployment scheme of trucks to routes to save resources.

1 Claim, 8 Drawing Sheets

Related U.S. Application Data which is a continuation-in-part of application No. 11/854,387, filed on Sep. 12, 2007, now Pat. No. 10,185,922, which is a continuation-in-part of application No. 11/345,867, filed on Feb. 2, 2006, now Pat. No. 7,949,557.

(60) Provisional application No. 61/053,716, filed on May 16, 2008, provisional application No. 61/050,978, filed on May 6, 2008, provisional application No. 60/650,610, filed on Feb. 7, 2005.

(51) Int. Cl.
*G06Q 50/26* (2012.01)
*B65F 3/00* (2006.01)
*G06Q 30/02* (2012.01)
*B65F 1/14* (2006.01)

(52) U.S. Cl.
CPC ........ *G06Q 50/26* (2013.01); *B65F 2210/184* (2013.01)

(58) Field of Classification Search
USPC .......................................................... 705/14
See application file for complete search history.

(56) References Cited

U.S. PATENT DOCUMENTS

| | | | |
|---|---|---|---|
| 5,035,564 A | 7/1991 | Matsumoto | |
| 5,072,833 A | 12/1991 | Hansen et al. | |
| 5,209,312 A | 5/1993 | Jensen | |
| 5,209,361 A | 5/1993 | Grubb, Jr. | |
| 5,230,393 A | 7/1993 | Mezey | |
| 5,237,507 A | 8/1993 | Chasek | |
| 5,251,761 A | 10/1993 | Hansen et al. | |
| 5,251,944 A | 10/1993 | Truitt | |
| 5,304,744 A | 4/1994 | Jensen | |
| 5,333,984 A | 8/1994 | Bayne et al. | |
| 5,355,987 A | 10/1994 | Dewoolfson et al. | |
| 5,416,279 A | 5/1995 | Tseng | |
| 5,425,456 A | 6/1995 | Erickson | |
| 5,447,017 A | 9/1995 | Becher et al. | |
| 5,501,567 A | 3/1996 | Lanzdorf et al. | |
| 5,484,246 A | 6/1996 | Horning et al. | |
| 5,628,412 A | 5/1997 | Hulls | |
| 5,699,525 A | 12/1997 | Enbutsu et al. | |
| 5,704,558 A | 1/1998 | Arrott | |
| 5,712,990 A | 1/1998 | Henderson | |
| 5,833,429 A | 11/1998 | McNeilus et al. | |
| 5,837,945 A | 11/1998 | Cornwell et al. | |
| 5,842,652 A | 12/1998 | Warsing et al. | |
| 5,871,114 A | 2/1999 | Anderson et al. | |
| 5,923,016 A | 7/1999 | Fredregill et al. | |
| 5,934,867 A | 8/1999 | Christenson | |
| 5,960,402 A | 9/1999 | Embutsu et al. | |
| 5,965,858 A | 10/1999 | Suzuki et al. | |
| 5,983,198 A | 11/1999 | Mowery et al. | |
| 6,026,370 A | 2/2000 | Jermyn | |
| 6,055,573 A | 4/2000 | Gardenswartz et al. | |
| 6,292,785 B1 | 9/2001 | McEvoy et al. | |
| 6,496,804 B2 | 2/2002 | McEvoy et al. | |
| 6,448,898 B1 | 9/2002 | Kasik | |
| 6,663,004 B2 | 12/2003 | Wagner et al. | |
| 6,664,897 B2 | 12/2003 | Pape et al. | |
| 6,718,343 B2 | 4/2004 | Kamata | |
| 6,811,030 B1 | 11/2004 | Compton et al. | |
| 6,952,625 B2 | 10/2005 | Uetake et al. | |
| 6,993,712 B2 | 1/2006 | Ramachandran et al. | |
| 7,032,820 B2 | 4/2006 | Kreiner et al. | |
| 7,133,895 B1 | 11/2006 | Lee et al. | |
| 7,134,084 B1 | 11/2006 | Rashid et al. | |
| 7,136,865 B1 | 11/2006 | Ra et al. | |
| 7,158,970 B2 | 1/2007 | Chang et al. | |
| 7,167,836 B2 | 1/2007 | Gottselig et al. | |
| 7,251,620 B2 | 7/2007 | Walker et al. | |
| 7,267,262 B1 | 9/2007 | Brown | |
| 7,312,708 B2 | 12/2007 | Tano | |
| 7,313,602 B2 | 12/2007 | Ono et al. | |
| 7,328,842 B2 | 2/2008 | Wagner et al. | |
| 7,395,247 B2 | 7/2008 | Sokei et al. | |
| 7,398,225 B2 | 7/2008 | Voltmer et al. | |
| 7,398,226 B2 | 7/2008 | Haines et al. | |
| 7,398,248 B2 | 7/2008 | Phillips et al. | |
| 7,424,441 B2 | 9/2008 | George et al. | |
| 7,428,498 B2 | 9/2008 | Voltmer et al. | |
| 7,441,197 B2 | 10/2008 | Tschiegg et al. | |
| 7,496,524 B2 | 2/2009 | Voltmer et al. | |
| 7,561,045 B2 | 7/2009 | Langlois et al. | |
| 7,613,628 B2 | 11/2009 | Ariff et al. | |
| 7,620,567 B2 | 11/2009 | George et al. | |
| 7,689,682 B1 | 3/2010 | Eldering et al. | |
| 7,696,874 B2 | 4/2010 | Stevens | |
| 7,728,730 B2 | 6/2010 | Langlois et al. | |
| 7,813,946 B2 | 10/2010 | Mizuno et al. | |
| 7,813,955 B2 | 10/2010 | Ariff et al. | |
| 7,848,981 B2 | 12/2010 | Bertogg | |
| 7,856,377 B2 | 12/2010 | Cohagan et al. | |
| 7,870,025 B2 | 1/2011 | English | |
| 7,873,552 B2 | 1/2011 | Campo et al. | |
| 7,934,649 B2 | 5/2011 | Kreiner et al. | |
| 7,936,484 B2 | 5/2011 | Roncal | |
| 7,949,557 B2 | 5/2011 | Fitzgerald et al. | |
| 7,999,688 B2 | 8/2011 | Healey et al. | |
| 8,024,220 B2 | 9/2011 | Ariff et al. | |
| 8,065,182 B2 | 11/2011 | Voltmer et al. | |
| 8,138,923 B2 | 3/2012 | Grunwald et al. | |
| 8,266,076 B2 | 9/2012 | Lopez et al. | |
| 8,502,699 B2 | 8/2013 | Zerwekh et al. | |
| 8,602,298 B2 | 12/2013 | Gonen et al. | |
| 8,862,495 B2 | 10/2014 | Ritter | |
| 10,185,922 B2 | 1/2019 | Gonen | |
| 2001/0047299 A1 | 11/2001 | Brewer et al. | |
| 2002/0026326 A1 | 2/2002 | Stevens | |
| 2002/0040564 A1 | 4/2002 | Killingbeck et al. | |
| 2002/0082920 A1 | 6/2002 | Austin et al. | |
| 2002/0188511 A1 | 12/2002 | Johnson et al. | |
| 2003/0040854 A1 | 2/2003 | Rendahl et al. | |
| 2003/0065610 A1 | 4/2003 | Brown et al. | |
| 2003/0233278 A1 | 12/2003 | Marshall | |
| 2004/0049424 A1 | 3/2004 | Murray et al. | |
| 2004/0083216 A1 | 4/2004 | Kozam et al. | |
| 2004/0167799 A1 | 8/2004 | Berry | |
| 2004/0199545 A1 | 10/2004 | Wagner et al. | |
| 2005/0027597 A1 | 2/2005 | Peterson | |
| 2005/0038572 A1 | 2/2005 | Krupowicz | |
| 2005/0059849 A1 | 3/2005 | Liu | |
| 2005/0080520 A1 | 4/2005 | Kline et al. | |
| 2005/0043963 A1 | 5/2005 | Soga et al. | |
| 2005/0131757 A1 | 6/2005 | Chan et al. | |
| 2005/0256767 A1 | 11/2005 | Friedman | |
| 2005/0273340 A1 | 12/2005 | Yamamoto | |
| 2006/0080819 A1 | 4/2006 | McAllister | |
| 2006/0224450 A1 | 10/2006 | Moon | |
| 2006/0235808 A1* | 10/2006 | Berry | G06Q 10/08 705/414 |
| 2006/0253407 A1 | 11/2006 | Waddell et al. | |
| 2006/0271423 A1 | 11/2006 | Hiranoya | |
| 2006/0273180 A1 | 12/2006 | Ammond et al. | |
| 2007/0038511 A1 | 2/2007 | Hytken | |
| 2007/0100694 A1 | 5/2007 | Kopps | |
| 2007/0174073 A1 | 7/2007 | Hunscher et al. | |
| 2007/0219862 A1* | 9/2007 | Casella | B65F 1/1484 705/14.11 |
| 2007/0260466 A1 | 11/2007 | Casella et al. | |
| 2008/0041996 A1 | 2/2008 | Shaw et al. | |
| 2008/0086411 A1 | 4/2008 | Olson et al. | |
| 2008/0183634 A1 | 7/2008 | Sadler | |
| 2008/0275772 A1 | 11/2008 | Suryanarayana et al. | |
| 2008/0320139 A1 | 12/2008 | Fukuda et al. | |
| 2009/0132641 A1 | 5/2009 | Sanguinetti et al. | |
| 2009/0138358 A1 | 5/2009 | Gonen et al. | |
| 2009/0228405 A1 | 9/2009 | Lopez et al. | |
| 2011/0258128 A1 | 10/2011 | Hambleton et al. | |

(56) References Cited

U.S. PATENT DOCUMENTS

| | | | | |
|---|---|---|---|---|
| 2013/0024335 | A1* | 1/2013 | Lok | G06Q 20/14 |
| | | | | 705/34 |
| 2015/0154568 | A1 | 6/2015 | Gu | |
| 2015/0178760 | A1* | 6/2015 | Chen | G06Q 30/0226 |
| | | | | 705/14.27 |
| 2017/0081120 | A1* | 3/2017 | Liu | B65F 3/00 |
| 2018/0025375 | A1* | 1/2018 | Armen | G06Q 30/0227 |
| | | | | 705/14.27 |
| 2018/0204158 | A1* | 7/2018 | Ratti | G08G 1/202 |
| 2019/0019167 | A1* | 1/2019 | Candel | B65F 3/02 |
| 2020/0191580 | A1* | 6/2020 | Christensen | G06Q 10/30 |
| 2020/0249028 | A1* | 8/2020 | Fridin | G01C 21/32 |

FOREIGN PATENT DOCUMENTS

| | | | |
|---|---|---|---|
| JP | 2002073896 A2 | 3/2002 | |
| JP | 2002297840 A | 10/2002 | |
| JP | 2003099520 A | 4/2003 | |
| JP | 2005008339 A | 1/2005 | |
| KR | 1020000050040 A | 8/2000 | |
| KR | 1020000072479 A | 12/2000 | |
| KR | 1020020084880 A | 11/2002 | |
| KR | 1020060099489 A | 9/2006 | |
| KR | 1020080008694 A | 1/2008 | |
| KR | 1020080013246 A | 2/2008 | |

OTHER PUBLICATIONS

City of Bridgeport Recycling Rate Up 67 Percent with Recyclebank Partnership, Single-Stream Recycling: City Saves Nearly $400,000 as a result of increased recycling. (Aug. 28, 2013). U.S. Newswire (Year: 2013).*
"4 Ways to Earn Cash for Recycling", US News and World Report, Jul. 31, 2008, (2 pages).
"Bags to Riches", Good Magazine, Mar./Apr. 2007, (1 page).
"It's Easy Being Green: It Pays to Recycle", Center for American Progress, Jul. 16, 2008, (2 pages).
"New "American Scrap Coalition" Will Address Global Trade Barriers", Reuters, Jun. 12, 2008, 92 (2 pages).
"Special Report: Recycle Bank Set for the UK?", Letsrecycle.com, Jul. 25, 2008, (4 pages).
"Technology Pioneers 2009," World Economic Forum, (36 pages).
"World Economic Forum Names Recycle Bank a 2009 Technology Pioneer", retrieved from http://corporate.recyclebank.com/press/press-releases, Published Dec. 4, 2008, (4 pages).
Gonen, European Search Repod on EP Application No. EP08747881. 4, Publisher: EPO, Published in: EP, dated Mar. 18, 2011, (9 pages).
*Card Verification Solutions* vs. *Citigroup Inc*, patent infringement suit against U.S. Pat. No. 5,826,245, United States District Court for the Northern District of Illinois Eastern Division, Case No. 13C6339, Judge Virginia M. Kendall, Sep. 29, 2014, (11 pages).
Colimore, Edward, "Cherry Hill Starts Cashing in on Recycling", The Philadelphia Inquirer, Jun. 30, 2008, (2 pages).
Desai, Anuj et al., "The Plenty 20 Awards for 2008," (4 pages).
Desimone, Bonnie, "Rewarding Recyclers, and Finding Gold in the Garbage", The New York Times, retrieved from http://www.nytimes.com/2006, dated Feb. 21, 2006 (3 pages).
Examiner Report on GB Application No. GB1104976.4, by Wolff et al., Publisher: IPO.UK, Published in: GB, dated Oct. 21, 2011, (2 pages).
Glick, Alexis, "Taking Trash.. Literally", The Glick Report, Fox Business, Jul. 31, 2008, (1 page).
Gunther, Marc, "Turning Trash Into Cash", Fortune Magazine, retrieved from http://money.cnn.com/2007, dated Sep. 20, 2007 (3 pages).
Hays, Julia, "Hauler: New Recycling Program Runs Smoothly", Courier-Post, Jul. 1, 2008, (2 pages).
International Search Report and Written Opinion, for Application No. PCT/2008/055687, dated Aug. 20, 2008, (9 pages).
International Search Report and Written Opinion, for Application No. PCT/2008/055689, dated Jul. 17, 2008, (10 pages).
International Search Report and Written Opinion, for Application No. PCT/2008/074647, dated Mar. 25, 2009, (8 pages).
International Search Report and Written Opinion, for Application No. PCT/2009/042801, dated Nov. 30, 2009, (15 pages).
International Search Report and Written Opinion, for Application No. PCT/2009/042812, dated Dec. 21, 2009, (10 pages).
International Search Report and Written Opinion, for Application No. PCT/2010/021757, dated Aug. 31, 2010, (9 pages).
International Search Report and Written Opinion, for Application No. PCT/2010/025993, dated Oct. 29, 2010, (11 pages).
International Search Report and Written Opinion on International Application No. PCT/US2007/079440, dated Apr. 23, 2008, (12 pages).
International Search Report, form PCT/ISA/210, for International Application No. PCT/US2007/079440, dated Apr. 23, 2008, (3 pages).
International Search Report, form PCT/ISA/210, for International Application No. PCT/US2009/031129, dated Jun. 16, 2009 (4 pages).
International Search Report, form PCT/ISA/210, for International Application No. PCT/US2009/042812, dated Dec. 21, 2009 (4 pages).
Jenny Mero, "Wasteful Thinking," Fortune Magazine, Apr. 2008, (1 page).
Jones, Charisse, "Residents Reap Rewards for Recycling", USA Today, Jul. 9, 2008, (3 pages).
Judkis, Maura, "4 Ways to Earn Cash for Recycling", U.S. News & World Report, Jul. 30, 2008, (2 pages).
Knoblauch, Jessica A., "Turning Your Trash Into Cash", Plenty Magazine, (3 pages).
Laidler, John, "Residents Find Recycling Has Its Just Reward", The Boston Globe, Jul. 27, 2008, (2 pages).
Notification of Transmittal of the International Search Report, form PCT/ISA/220, for International Application No. PCT/US20071079440, dated Apr. 23, 2008, (3 pages).
Notification of Transmittal of the International Search Report, form PCT/ISA/220, for International Application No. PCT/US2009/031129, dated Jun. 16, 2009 (4 pages).
Notification of Transmittal of the International Search Report, form PCT/ISA/220, for International Application No. PCT/US2009/042812, dated Dec. 21, 2009 (4 pages).
Peretsman, Natalie, "Rewarding Recycling", Scienceline, Jun. 12, 2008, (5 pages).
Satullo, Chris, "The Right Kind of 'Nudge' Improves Life for Citizens", The Philadelphia Inquirer, Jul. 20, 2008, (2 pages).
Siegel, Robert, "What's Behind a Patchwork of Recycling Rules?", NPR, Jul. 28, 2008, (3 pages).
Walsh, Bryan, "Making Recycling Really Pay", Time Magazine, retrieved from http://www.time.com/time/health/article, Apr. 11, 2008 (2 pages).
Wong, Wylie, "Going Green", Biztech Magazine, retrieved from http://www.biztechmagazine.com/article, Mar. 2008 (4 pages).
Written Opinion of the International Searching Authority, form PCT/ISA/237, for International Application No. PCT/US2007/079440, dated Apr. 23, 2008, (5 pages).
Written Opinion of the International Searching Authority, form PCT/ISA/237, for International Application No. PCT/US2009/042812, dated Dec. 21, 2009, (3 pages).
Written Opinion of the International Searching Authority, from PCT/ISA/237, for International Application No. PCT/US2009/031129, dated Jun. 16, 2009 (6 pages).

* cited by examiner

600

INCENTIVE-BASED WASTE REDUCTION SYSTEM AND METHOD THEREOF

CROSS-REFERENCE TO RELATED APPLICATIONS

This application is a continuation-in-part of U.S. patent application Ser. No. 12/435,619, filed May 5, 2009, now U.S. Pat. No. 10,354,474, which is a continuation-in-part of U.S. patent application Ser. No. 11/345,867, filed Feb. 2, 2006, now U.S. Pat. No. 7,949,557, which claims the benefit of U.S. Provisional Patent Application Ser. No. 60/650,610, filed Feb. 7, 2005, and U.S. patent application Ser. No. 12/435,619, filed May 5, 2009, now U.S. Pat. No. 10,354,474, is also a continuation-in-part of U.S. patent application Ser. No. 11/854,387, filed Sep. 12, 2007, now U.S. Pat. No. 10,185,922, and U.S. patent application Ser. No. 12/435,619, filed May 5, 2009, now U.S. Pat. No. 10,354,474 also claims the benefit of and priority to U.S. Patent Application No. 61/050,978, entitled "Incentive-Based Waste Reduction System and Method Thereof," filed May 6, 2008, and of U.S. Patent Application No. 61/053,716, entitled "Incentive-Based Waste Reduction System and Method Therefor," filed May 16, 2008, all of which are incorporated by reference herein in their entirety.

BACKGROUND

Field of the Invention

Embodiments of the present invention generally relate to a waste management system. More specifically, embodiments of the present invention relate to an incentive-based waste reduction system and method thereof.

Description of Related Art

The cost of waste collection and disposal in many cities around the world has reached a critical level. The decrease in available landfill capacity translates directly into an increase in cost for disposing of municipal solid waste. As such, cities and towns across the United States and around the world are seeking cost-efficient alternatives to landfill disposal and other increasingly costly forms of waste processing.

Furthermore, even where landfill capacity exists, there remains the potential for environmental hazards associated with landfill operation. Toxic chemicals and other hazardous substances contained in landfills have the potential to leech into the surrounding environment, causing contamination of groundwater and soil. Additionally, the methane gas produced from the decomposition of decaying waste matter is a greenhouse gas, having a warming potential which is about twenty-five times that of carbon dioxide. As such, disposal of non-reusable materials has a significant impact on the environment, which will negatively impact the future of our planet.

In view of the above described financial and environmental consequences associated with the disposal of waste in landfills, many municipalities have been encouraged to actively pursue alternatives to conventional waste disposal. Although there have been many attempts made in the past to implement a system for promoting recycling habits and discouraging disposal of non-reusable materials, none have yet been practical, feasible, or effective for achieving their intended purpose.

Thus, there is a need for an incentive-based system designed to encourage waste reduction, and a method of operating and managing the same.

SUMMARY

An incentive-based waste reduction system and method thereof are disclosed herein. In accordance with one embodiment of the present invention, an incentive-based waste reduction system comprises a collection means comprising at least a load-determining device, the collection means for obtaining a quantifiable measure of waste material from an entity, a value associated with the quantifiable measure of waste material, an adjustment factor for adjusting the value associated with the quantifiable measure of waste material, determined from an algorithm, the algorithm taking as an input at least a predetermined factor, a credit value associated with at least a quantifiable measure of deposited waste material, and a reward value associated with the credit value.

In accordance with another embodiment of the present invention, a method for implementing an incentive-based waste reduction system comprises the steps of collecting at least a quantifiable measure of deposited waste material associated with an entity, obtaining and recording one or more values associated with at least a quantifiable measure of deposited waste material, adjusting one or more values associated with at least a quantifiable measure of deposited waste material based on a predetermined disposal allotment value, associating a credit with one or more values associated with at least a quantifiable measure of deposited waste material, and distributing a credit to the entity.

In accordance with yet another embodiment of the present invention, a method for implementing an incentive-based diversion system comprises the steps of collecting a quantifiable measure of deposited waste material, collecting a quantifiable measure of deposited recyclable material, obtaining one or more values associated with the quantifiable measure of deposited waste material, obtaining one or more values associated with the quantifiable measure of deposited recyclable material, adjusting one or more values associated with at least one of the quantifiable measure of deposited waste material and the quantifiable measure of deposited recyclable material based on a predetermined diversion ratio, associating a credit with one or more values associated with at least one of the quantifiable measure of deposited waste material and the quantifiable measure of deposited recyclable material, and distributing a credit to the entity.

In accordance with yet another embodiment of the present invention, a tangible computer-readable medium comprises program instructions, wherein the program instructions are computer-executable to implement: inputting data associated with at least one of a quantifiable measure of deposited waste material and a quantifiable measure of deposited recyclable material, obtaining one or more values associated with at least one of the quantifiable measure of deposited waste material and the quantifiable measure of deposited recyclable material, adjusting one or more values associated with at least one of a quantifiable measure of deposited waste material and a quantifiable measure of deposited recyclable material based on a predetermined factor, associating a credit with one or more values associated with at least one of the quantifiable measure of deposited waste material and the quantifiable measure of deposited recyclable material, and distributing a credit to the entity.

BRIEF DESCRIPTION OF THE DRAWINGS

So the manner in which the above-recited features of the present invention can be understood in detail, a more particular description of embodiments of the present invention, briefly summarized above, may be had by reference to embodiments, one of which is illustrated in the appended drawings. The appended drawings illustrate only typical embodiments of embodiments encompassed within the scope of the present invention, and, therefore, are not to be considered limiting, for the present invention may admit to other equally effective embodiments.

Figure 1:
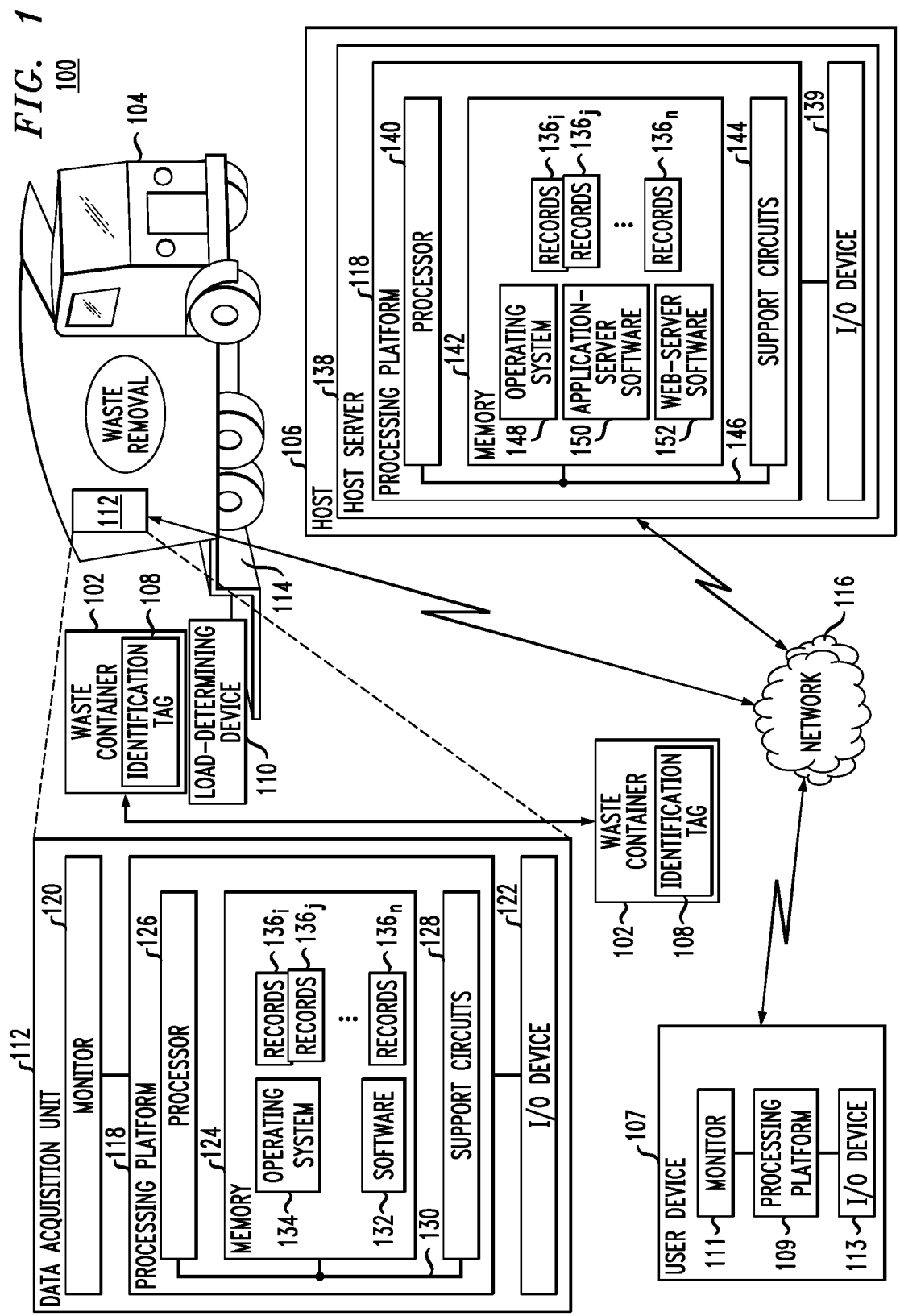
FIG. 1 depicts an incentive-based waste reduction system in accordance with one embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including but not limited to. To facilitate understanding, like reference numerals have been used, where possible, to designate like elements common to the figures.

DETAILED DESCRIPTION

Embodiments of the present invention generally relate to an incentive-based waste reduction program. Other incentive-based systems are disclosed with respect to recycling. Such systems are disclosed in commonly owned United States Patent Application Publication No. 2006/0178933, entitled "Method and System for Improving Recycling Through the Use of Financial Incentives," published Aug. 10, 2006, and United States Patent Application Publication No. 2008/0059970, entitled "Methods and System for Managing Recycling of Recyclable Material," published Mar. 6, 2008, the entire disclosures of which are incorporated herein by reference.

FIG. 1 depicts an incentive-based waste reduction system in accordance with one embodiment of the present invention. Generally, the system 100 comprises a waste container 102, a pickup vehicle 104, a host 106 and a user device 107.

In many embodiments, the waste container 102 is adapted to accept recyclable and/or other waste material deposited by an entity ("deposited material") for collection by the pickup vehicle 104. As used herein, the terms "recyclables," "recyclable materials," and all derivative forms thereof, refer to at least conventional recyclable materials (e.g., metals, plastics, glass, wood, paper, textiles) and may additionally include organic materials (e.g., biodegradable waste), any other compostable and/or biodegradable material, or reusable material. As used herein, the terms "waste," "waste material," and all derivative forms thereof, may refer to any tangible material not classified as a recyclable above. The deposited material may include one type of or any combination of types of recyclable and/or waste material.

The waste container 102 may be of any shape or size so long as it is adapted to hold a quantifiable measure of the deposited material. The waste container 102 may be provided to an entity or user (not shown) for a fee (e.g., a one-time, fixed, rental, deposit, or other type of fee) or for free (e.g., on loan or given outright). In another embodiment, a user may be provided with a plurality of waste containers 102. In such an embodiment, each waste container may be used to store different types of materials (e.g., recyclables, organics, garbage). In yet another embodiment, separate waste containers 102 may be used to contain each type of material per container (i.e., recyclables in container 102, post organics/yard waste in container 102 and garbage in container 102).

The waste container 102 may include an identification tag 108 for identifying the waste container 102. The identification tag 108 may be used to track each collection of the deposited material. The identification tag 108 may be machine-readable device, such as a bar-code label, a magnetic-strip device, a radio-frequency-identification ("RFID") tag and the like; and may include and/or be programmed with information for identifying the waste container 102, and in turn, information (e.g., an address, an account, etc.) associated with the entity ("entity information").

Alternatively, the identification tag 108 may be a non-machine readable label or other non-machine readable device. As such, the identification tag 108 may include an identifier that can be transferred to (e.g., manually entered into) the host 106, which in turn, uses the identifier to obtain information stored thereon for identifying the waste container 102 and the entity information.

The pickup vehicle 104 may be a truck or other movable vehicle adapted to receive the recyclable and waste materials from the waste container 102. For example, the pickup vehicle 104 may include a lift 114 adapted to receive, capture and/or cause the transfer of at least some or all of the deposited material from the waste container 102. One exemplary type of pickup vehicle is a "garbage truck," such as the type disclosed by U.S. Pat. No. 4,242,311, which is incorporated herein by reference in its entirety.

In addition, the pickup vehicle 104 may include a load-determining device 110 and a data acquisition unit 112. The load-determining device 110 may include any of, any multiple of, any combination of or any combination of multiples of a scale, load cell, load-cell system, a counting device and/or system or other measuring apparatus or system for (i) determining a quantifiable measure (e.g., weight, quantity, etc.) of the deposited material and/or (ii) transferring such quantifiable measure ("deposited-material measure") to the data-acquisition unit 112 for storage and/or subsequent processing. The load-determining device 110 may, for example, determine the deposited-material measure as a function of a plurality of weight measurements of the waste container 102 obtained before and after the deposited material are transferred to the pickup vehicle 104.

Alternatively, the load-determining device 110 may determine the deposited-material measure as a function of quantities and types of the deposited material in waste container 102 before and after such material are transferred to the pickup vehicle 104. The load-determining device 110 may determine the deposited material measure in other ways as well.

Some or the entire load-determining device 110 may be coupled (e.g., affixed or removably attached) to the pickup vehicle 104. For example, all or portions of the load-determining device 110 may be coupled to the lift 114. Alternatively, all or portions of the load-determining device 110 may be removably attached to the vehicle for storage during transport, and detached from the pickup vehicle 104 to allow the load-determining device 110 to determine the deposited-material measure and/or transfer the deposited-material measure to the data-acquisition unit 112.

The data-acquisition unit 112 and host 106 may be communicatively coupled together via a link or network (collectively "network") 116. This way, the data-acquisition unit 112 and host 106 may exchange information via one or more communications carried over the network 116.

The network 116 may be a partial or full deployment of most any communication or computer network or link, including any of, any multiple of, any combination of or any combination of multiples of a public or private, terrestrial wireless or satellite, and wireline networks or links. The network 116 may include, for example, network elements from a Public Switch Telephone Network ("PSTN"), the Internet, core and proprietary public networks, wireless voice and packet-data networks, such as 1G, 2G, 2.5G and 3G telecommunication networks, wireless office telephone systems ("WOTS") and/or wireless local area networks ("WLANs"), including, Bluetooth and/or IEEE 802.11 WLANs, wireless personal area networks ("WPANs"), wireless metropolitan area networks ("WMANs") and the like; and/or communication links, such as Universal Serial Bus ("USB") links; parallel port links, Firewire links, RS-232 links, RS-485 links, Controller-Area Network ("CAN") links, and the like.

The network elements and/or communication links may include circuit switches as well as packet-data elements to provide transport of content, triggers and/or other information; and may be configured to communicate such information using any number of protocols and in any manner consistent with exchanging such information among data-acquisition unit 112 and host 106. These protocols may include standardized, proprietary, open-source, and freely-available communication protocols for communicating content in circuit-switching and/or packet data networks, and the like.

The data acquisition unit 112 may be, for example, any of or any combination of a personal computer; a portable computer, a handheld computer, a mobile phone, a digital assistant, a personal digital assistant, a cellular phone, a smart phone, a pager, a digital tablet, a laptop computer, an Internet appliance and the like. In general, the data acquisition unit 112 includes a processor-based platform that operates on any suitable operating system, such as Microsoft® Windows®, Linux and/or Symbian; and that is capable of executing software.

Additionally, the data acquisition unit 112 may be formed in a single unitary device and concentrated on a single server, client, peer or other type node. Alternatively, the data acquisition unit 112 may be formed from one or more separate devices, and as such, may be distributed among a number of server, client, peer or other type nodes. The data acquisition unit 112 may also be scalable (i.e., may employ scale-up and/or scale-out approaches).

The data acquisition unit 112 may include a large number of elements, most of which are not shown in FIG. 1 for simplicity of exposition. As shown, the data acquisition unit 112 includes a processing platform 118 that is operable to control, manipulate or otherwise interact with a monitor 120 or other display device (collectively "monitor") and/or an input/output ("I/O") device 122, via respective couplings.

The monitor 120 may be any suitable device that displays viewable images and/or text generated by the processing platform 118. For instance, the monitor 120 may be any of or any combination of a liquid-crystal-display (LCD) based monitor, a cathode ray tube (CRT) monitor, a plasma display monitor, a surface-conduction electron-emitter display (SED) monitor, an organic light-emitting diode (OLED) display monitor, or any other monitor that can display viewable images using television and/or computer protocols, such as Super Video Graphics Array, Digital Visual Interface, Phase Alternating Line, SECAM, NTSC, etc.

The I/O device 122 may be any device that accepts input from a user (man or machine) to control, manipulate or otherwise interact with the operation of the processing platform 118. In addition, the I/O device 122 may be adapted to obtain from the identification tag 108 the entity information and/or identifier that identifies the waste container 102. Examples of the I/O device 120 include any of or any combination of pointing device, such as a mouse, joystick, trackball, touchpad, pointing stick, light pen, head pointer, soap mouse, eye tracking devices, digitizing tablet and stylus, data glove that translates the user's movements to computer gestures; a key-in device, such as a keyboard or a touchpad; and a reader, such as a bar-code reader, a magnetic-strip reader, a RFID reader, and the like. Although shown as a single device, the I/O device 122 may be separated into two or more devices, each of which may have, as compared to the I/O device 122, reduced, increased or equivalent functionality. In addition, the I/O device 122 and the monitor 120 may be integrated or otherwise combined together in a single device and/or housing.

The processing platform 118 includes memory 124, one or more processors (collectively "processor") 126, support circuits 128 and bus 130. The memory 124 may be or employ random access memory (RAM), read-only memory (ROM), optical storage, magnetic storage, removable storage, erasable programmable read only memory and variations thereof, content addressable memory and variations thereof, flash memory, disk drive storage, removable storage, any other memory type feasible in the context of the present invention, any combination thereof, or the like.

The memory 124 may store and/or receive requests from the processor 126 to execute software 132, such as operating system 134. Additionally, the memory 124 may store and/or receive requests from the processor 126 to obtain (i) operands, operators, dimensional values, configurations, and other data that are used by the operating system 134 and the software 132 to control the operation of and/or to facilitate performing the functions of the data acquisition unit 112; and/or (ii) one or more records or other data structures (collectively, "records") $136_i$-$136_n$.

Each of the records $136_i$-$136_n$ may be stored as or in a single file or a plurality of files, and may be structured as text, a table, a database, a distributed hash table, a distributed concurrent object store, a document formed using a markup or markup-like language, any other structure feasible in the context of the present invention, any combination thereof, or the like. The records $136_i$-$136_n$ may include, for example, a deposited-material record $136_j$. The deposited-material record $136_j$ may store, be populated with, or otherwise adapted to hold the deposited-material measure as determined by the load-determining device 110.

The processor 126 may execute (e.g., launch, generate, run, maintain, etc.) and/or operate on the operating system 134. The processor 126 may be capable of (i) executing the software 132; (ii) storing the records $136_i$-$136_n$ in the memory 124; (iii) dispatching to the host 106 the records $136_i$-$136_n$ (including the deposited-material record $136_j$) for further processing; (iv) issuing triggers and/or (v) issuing one or more commands and/or instructions to cause the further processing of records $136_i$-$136_n$. Examples of the processor 126 include conventional processors, microprocessors, multi-core processors, microcontrollers, and the like.

The support circuits 128 facilitate operation of the processor 126 and may include well-known circuitry or circuits, including, for example, an I/O interface, one or more network-interface units ("NIUs"); cache; clock circuits; power supplies; any other structure feasible in the context of the present invention; any combination thereof; or the like. The NIUs may be adapted for communicating over any of, any multiple of, any combination of or any combination of multiples of terrestrial wireless, satellite, and/or wireline media. The processor 126 (and in turn, the data-acquisition unit 112) may use the NIUs for exchanging content with the host 106 via network 116.

The bus 130 provides for transmissions of digital information among the processor 126, the memory 124, support circuits 128 and other portions of the data acquisition unit 112 (shown and not shown). The I/O interface is adapted to control transmissions of digital information between (shown and not shown) components of the data acquisition unit 112. In addition, the I/O interface is adapted to control transmissions of digital information between I/O devices disposed within, associated with or otherwise attached to the data acquisition unit 112. Examples of the I/O devices include the I/O device 122, the monitor 120, and any or any combination of (i) storage devices, including but not limited to, a tape drive, a floppy drive, a hard disk drive or a compact disk drive; (ii) a receiver; (ii) a transmitter; (iii) a speaker; (iv) a display; (v) a speech synthesizer; (vi) an output port; and (vii) the like.

The operating system 134 may include code for operating the data acquisition unit 112 and for providing a platform onto which the software 132 can be executed. The software 132 may include data-acquisition software, which may carry out the acquisition of and storage of the deposited-material measure into the deposited-material record $136_j$. The data-acquisition software may also communicate the deposited-material record $136_j$ to the host 106 using, for example, the communication and/or security protocols compatible with the data acquisition unit 112 and the host 106. To facilitate this, the data-acquisition software may include code to allow the data-acquisition software (and/or the data acquisition unit 112) to substantiate its identity, and in turn, receive authorization to access (e.g., view, configure, use, and/or execute) services of the host 106.

The host 106 may include one or more servers, including a host server 138. The host server 138 may be deployed in one or more general or specialty purpose computers, personal computers, mainframes, minicomputers, server-type computers and/or any a processor-based platform that operates on any suitable operating system, such as Microsoft® Windows® and/or Linux, that is capable of executing software.

Like the data acquisition unit 112, the host server 138 may include a large number of elements, most of which are not shown in FIG. 1 for simplicity of exposition. The elements of host server 138 may be formed in a single unitary device and concentrated on a single server, client, peer or other type node. Alternatively, the elements of the host server 138 may be formed from two or more separate devices, and as such, may be distributed among a number of server, client, peer or other type nodes.

The host server 138 may be deployed in accordance with the scale-up and/or scale-out approaches. Using the scale-up approach, the host server 138 may increase its processing power, amount of memory and number of networkable connections by utilizing a symmetrical, multi-processor architecture so as to provide additional capacity. A benefit of this scale-up approach is that such approach provides for simplified configuration and management as compared to the scale-out approach. Using the scale-out approach, the host server 138 may increase its processing power, amount of memory and number of networkable connections by incrementally adding and/or removing capacity as needed, balancing workload across multiple processors, multiple servers, dedicating specific processors and/or servers for performing specific tasks, using physical or logical servers (e.g., a multi-node cluster approach), etc.

As shown, the host server 138 includes one or more processing units (collectively "processor") 140, memory 142, support circuits 144 and bus 146. The processor 140 may be one or more conventional processors, microprocessors, multi-core processors, microcontrollers, any other processor type feasible in the context of the present invention, any combination thereof, or the like.

The bus 146 provides for transmissions of digital information among the processor 140, memory 142 and support circuits 144 and other (not shown) portions of the host server 138. The support circuits 144 facilitate operation of the processor 140, and may include well-known circuitry or circuits, including, for example, one or more input/output I/O interfaces, one or more NIUs, cache, clock circuits, power supplies, and the like.

The I/O interface provides an interface to control the transmissions of digital information among (shown and not shown) components of host server 138. In addition, the I/O interface provides an interface to control the transmissions of digital information among I/O devices 139 associated with or otherwise attached to the host server 138. The I/O devices 139 may be embodied as any or any combination of (i) storage devices, including but not limited to, a tape drive, a floppy drive, a hard disk drive or a compact disk drive; (ii) a receiver; (ii) a transmitter; (iii) a speaker; (iv) a display; (v) a speech synthesizer; (vi) an output port; (vii) a pointing device, such as a mouse, joystick, trackball, touchpad, pointing stick, light pen, head pointer, soap mouse, eye tracking devices, digitizing tablet and stylus, data glove that translates the user's movements to computer gestures; (vii) a key-in device, such as a keyboard or a touchpad; (viii) and the like.

The NIUs facilitate exchange (e.g., sending and/or receiving) of content. Accordingly, the NIUs may be adapted for communicating over terrestrial wireless, satellite, and/or wireline media.

The memory 142 may be or employ random access memory (RAM), read-only memory (ROM), optical storage, magnetic storage, removable storage, erasable programmable read-only memory and variations thereof, content addressable memory and variations thereof, flash memory, disk drive storage, removable storage, any other storage medium feasible in the context of the present invention, any combination thereof, or the like. The memory 124 may store and/or receive requests from the processor 140 to execute various software packages, such as operating system 148, application-server software 150 and web-server software 152.

Additionally, the memory 142 may store and/or receive requests from the processor 140 to obtain the records $136_i$-$136_n$ (e.g., copies thereof). As above, each of the records $136_i$-$136_n$ may be stored as or in a single file or a plurality of files, and may be structured as text, a table, a database, a distributed hash table, a distributed concurrent object store, a document formed using a markup or markup-like language, or the like, or any combination thereof. The records $136_i$-$136_n$ may be stored, for example, using a Microsoft SQL Server and accessible through an ODBC connection.

Like the records $136_i$-$136_n$, the memory 142 may store and/or receive requests from the processor 140 to obtain operands, operators, dimensional values, configurations, and other data that are used by the various software packages to control the operation of and/or to facilitate performing the functions of the host server 138 and/or the host 106.

The application-server software 150, when executed by the processor 140, is operable to (i) communicate with the data acquisition unit 112, via the network 116, to obtain the deposited-material record $136_j$; and determine a value associated with the deposited-material measure stored in the deposited-material record $136_j$. In addition, the application-server software 150, when executed by the processor 140, is operable to associate the value to a credit, which may be redeemable by the entity; post the credit to a user account associated with the entity ("entity account"); and provide the web-server software 152 with access to the entity account.

The web-server software 152, when executed by the processor 140, is operable to provide one or more web pages to allow the entity to access the entity account, and in turn, the credit and other information associated with the waste reduction activities. For example, web-server software 152 may post the credit on the web pages that are accessible to entity via the user device 107 and entity account, so as to enable the entity to view details of the entity account. The details of the entity account may include the credit (and/or previously accrued credits) associated with the waste reduction activities of the deposited (and/or previously deposited) material, dates associated with the waste reduction activities, quantities and types of the deposited (and/or previously deposited) material recycled over a given period of time, debits from the credit (and/or previously accrued credits), detailed history of spending of the credit (and/or previously accrued credits), any orders or vouchers for redeemed credits, any other data or information feasible in the context of the present invention, any combination thereof, or the like.

In addition, the web-server software 152, when executed by the processor 140, is operable to allow the entity, via the user device 107, to redeem the credit. This may include the web-server software 152 providing a portal to retailers to allow the entity to redeem the credit (and/or previously accrued credits) at the retailers to obtain goods, services, coupons valued for goods or services, other benefits or discounts, any other goods and/or services feasible in the context of the present invention, any combination thereof, or the like.

The web-server software 152 may also be operable to allow the entity to transform the credit (and/or previously accrued credits) into one or more vouchers that may be spent at the participating retailers or donated to some other entity. To facilitate this, the web-server software 152 includes code to allow the entity to (i) order the vouchers for delivery by mail, e-mail or other communication medium; and/or (ii) provide information to the entity via the user device 107 to allow the entity to print or otherwise reduce to physical form, store it on the user device 107 or a peripheral device coupled to the user device 107 (e.g., a PDA, memory device, etc.).

The user device 107 may be, for example, any of or any combination of a personal computer, a portable computer, a handheld computer, a mobile phone, a digital assistant, a personal digital assistant, a cellular phone, a smart phone, a pager, a digital tablet, a laptop computer, an Internet appliance and the like. In general, the user device 100 may include a processor-based platform that operates on any suitable operating system, such as Microsoft® Windows®, Linux and/or Symbian, that is capable of executing software.

The user device 107 may, however, include a large number of elements, many of which are not shown in FIG. 1 for simplicity of exposition. The user device 107 includes elements similar to the data acquisition unit 112, except as described hereinbelow. The user device 107 may be formed in a single unitary device and concentrated on a single server, client, peer or other type node. Alternatively, the user device 107 may be formed from one or more separate devices, and as such, may be distributed among a number of server, client, peer or other type nodes. In addition, the user device 107 may be scalable.

As shown, the user device 107 may include a processing platform 109 operable to control, manipulate or otherwise interact with a monitor 111 and/or an I/O device 113, via respective couplings. The processing platform 109, the monitor 111 and the I/O device 113 include elements similar to or the same as the processing platform 118, the monitor 120 and the I/O device 122 of the data acquisition unit 112, and as such, the details of such elements are not reproduced here for simplicity of exposition.

The user device 107 is operable to form a user interface through which the entity can access the web pages provided by the web-server software 152. To facilitate this, the user interface may be communicatively coupled with the host server 138 via a network 116. The user interface may be, for example, a graphical-user interface that is operable to execute a web browser application for rendering on the monitor 111 the web pages provided by the web-server software 152. As noted, the entity may use the user device 107 to access the entity's account, redeem credits and/or other like functions.

Figure 2:
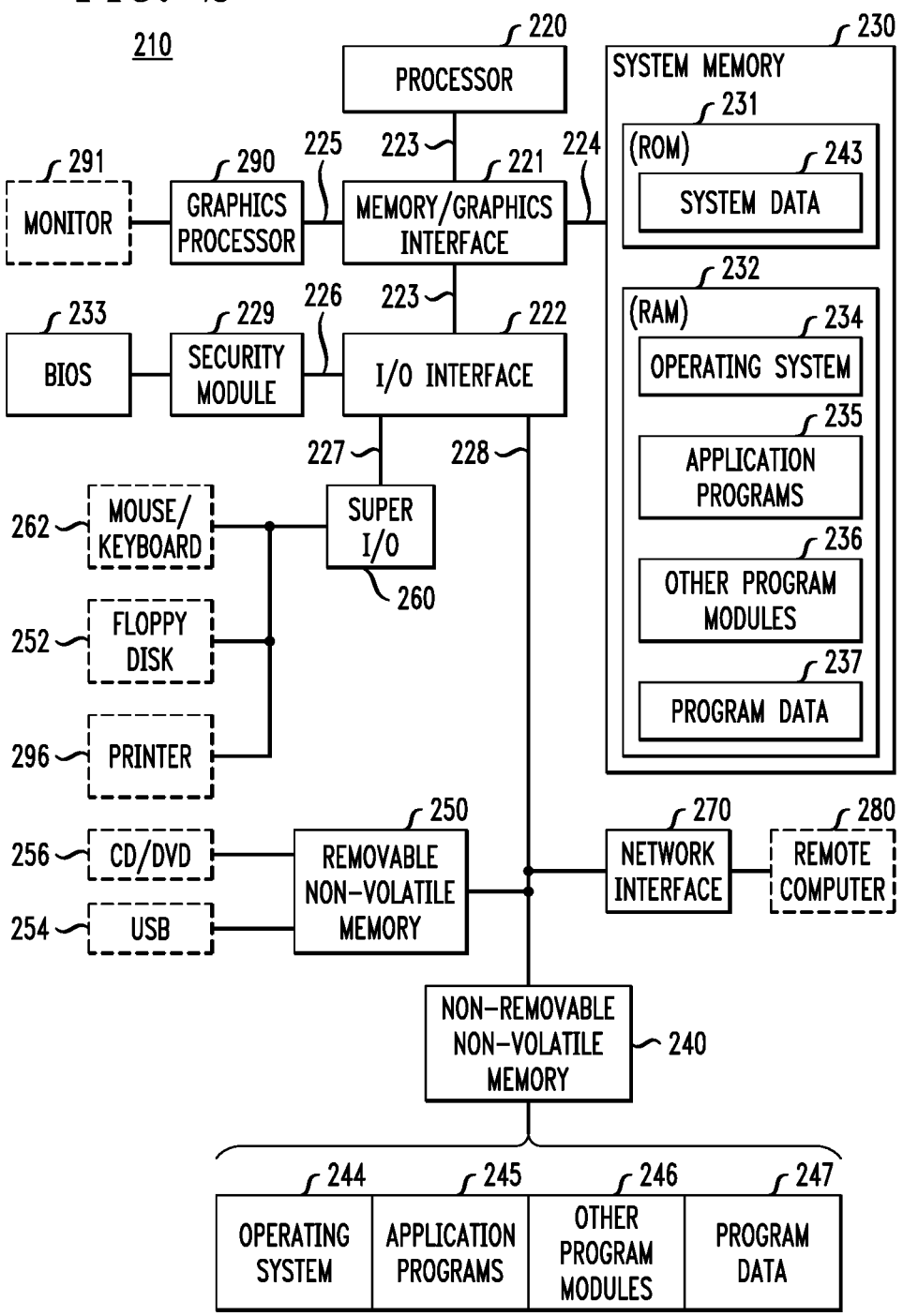
FIG. 2 depicts a general purpose computing system in accordance with one embodiment of the present invention.

In accordance with one embodiment of the present invention, at least one of the data acquisition unit, the user device, and/or the host comprise a computer or computer device, for example, the general purpose computing device in the form of a computer 210 depicted in FIG. 2. Components shown in dashed outline are not part of the computer 210, but are used to illustrate the exemplary embodiment of FIG. 2. Components of computer 210 may include, but are not limited to, a processor 220, a system memory 230, a memory/graphics interface 221, also known as a Northbridge chip, and an I/O interface 222, also known as a Southbridge chip. The system memory 230 and a graphics processor 290 may be coupled to the memory/graphics interface 221. A monitor 291 or other graphic output device may be coupled to the graphics processor 290.

A series of system busses may couple various system components including a high speed system bus 223 between the processor 220, the memory/graphics interface 221 and the I/O interface 222, a front-side bus 224 between the memory/graphics interface 221 and the system memory 230, and an advanced graphics processing (AGP) bus 225 between the memory/graphics interface 221 and the graphics processor 290. The system bus 223 may be any of several types of bus structures including, by way of example, and not limitation, such architectures include Industry Standard Architecture (ISA) bus, Micro Channel Architecture (MCA) bus and Enhanced ISA (EISA) bus. As system architectures evolve, other bus architectures and chip sets may be used but often generally follow this pattern. For example, companies such as Intel and AMD support the Intel Hub Architecture (IHA) and the Hypertransport architecture, respectively.

The computer 210 typically includes a variety of computer readable media. Computer readable media can be any available media that can be accessed by computer 210 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 210. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 230 includes computer storage media in the form of volatile and/or nonvolatile memory such as read only memory (ROM) 231 and random access memory (RAM) 232. The system ROM 231 may contain permanent system data 243, such as identifying and manufacturing information. In some embodiments, a basic input/output system (BIOS) may also be stored in system ROM 231. RAM 232 typically contains data and/or program modules that are immediately accessible to and/or presently being operated on by processor 220. By way of example, and not limitation, FIG. 2 illustrates operating system 234, application programs 235, other program modules 236, and program data 237.

The I/O interface 222 may couple the system bus 223 with a number of other busses 226, 227 and 228 that couple a variety of internal and external devices to the computer 210. A serial peripheral interface (SPI) bus 226 may connect to a basic input/output system (BIOS) memory 233 containing the basic routines that help to transfer information between elements within computer 210, such as during start-up.

In some embodiments, a security module 229 may be incorporated to manage metering, billing, and enforcement of policies. The security module 229 may comprise any known security technology suitable for embodiments disclosed herein.

A super input/output chip 260 may be used to connect to a number of "legacy" peripherals, such as floppy disk 252, keyboard/mouse 262, and printer 296, as examples. The super I/O chip 260 may be connected to the I/O interface 222 with a low pin count (LPC) bus, in some embodiments. The super I/O chip 260 is widely available in the commercial marketplace.

In one embodiment, bus 228 may be a Peripheral Component Interconnect (PCI) bus, or a variation thereof, may be used to connect higher speed peripherals to the I/O interface 222. A PCI bus may also be known as a Mezzanine bus. Variations of the PCI bus include the Peripheral Component Interconnect-Express (PCI-E) and the Peripheral Component Interconnect-Extended (PCI-X) busses, the former having a serial interface and the latter being a backward compatible parallel interface. In other embodiments, bus 228 may be an advanced technology attachment (ATA) bus, in the form of a serial ATA bus (SATA) or parallel ATA (PATA).

The computer 210 may also include other removable/non-removable, volatile/nonvolatile computer storage media. By way of example only, FIG. 2 illustrates a hard disk drive 240 that reads from or writes to non-removable, nonvolatile magnetic media. Removable media, such as a universal serial bus (USB) memory 254 or CD/DVD drive 256 may be connected to the PCI bus 228 directly or through an interface 250. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

The drives and their associated computer storage media discussed above and illustrated in FIG. 2, provide storage of computer readable instructions, data structures, program modules and other data for the computer 210. In FIG. 2, for example, hard disk drive 240 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies. A user may enter commands and information into the computer 210 through input devices such as a mouse/keyboard 262 or other input device combination. Other input devices (not shown) may include a microphone, joystick, game pad, satellite dish, scanner, or the like. These and other input devices are often connected to the processor 220 through one of the I/O interface busses, such as the SPI 226, the LPC 227, or the PCI 228, but other busses may be used. In some embodiments, other devices may be coupled to parallel ports, infrared interfaces, game ports, and the like (not depicted), via the super I/O chip 260.

The computer 210 may operate in a networked environment using logical connections to one or more remote computers, such as a remote computer 280 via a network interface controller (NIC) 270. The remote computer 280 may be a personal computer, a server, a router, a network PC, a peer device or other common network node, and typically includes many or all of the elements described above relative to the computer 210. The logical connection between the NIC 270 and the remote computer 280 depicted in FIG. 2 may include a local area network (LAN), a wide area network (WAN), or both, but may also include other networks. Such networking environments are commonplace in offices, enterprise-wide computer networks, intranets, and the Internet.

In some embodiments, the network interface may use a modem (not depicted) when a broadband connection is not available or is not used. It will be appreciated that the network connection shown is exemplary and other means of establishing a communications link between the computers may be used.

Although the computer 210 of FIG. 2 is described as an exemplary computing device for various applications of embodiments of the present invention, it should be appreciated, a multitude of similar computing devices exist and are equally suitable for embodiments of the present invention. It is further understood by embodiments of the present invention, a computing device may comprise all of the elements disclosed in FIG. 2, or any combination of one or more of such elements, in order to perform the necessary functions of the embodiments of the present invention.

It should be noted that any of the embodiments of the present invention described or contemplated herein may be utilized in connection with one or more embodiments of the inventions described in commonly-owned U.S. patent application Ser. No. 12/189,217, entitled "Recycling Kiosk System and Method Thereof," filed Aug. 11, 2008; and U.S. patent application Ser. No. 12/189,218, entitled "Drop-Off Recycling System and Method Thereof," filed Aug. 11, 2008, each of which is hereby incorporated by reference herein in its entirety. Each of these applications disclose alternative system architecture for enabling the incentive-based environmentally beneficial systems and methods thereof. As such, it is appreciated such architectures could support embodiments of the present invention, yielding substantially similar beneficial results.

Figure 3:
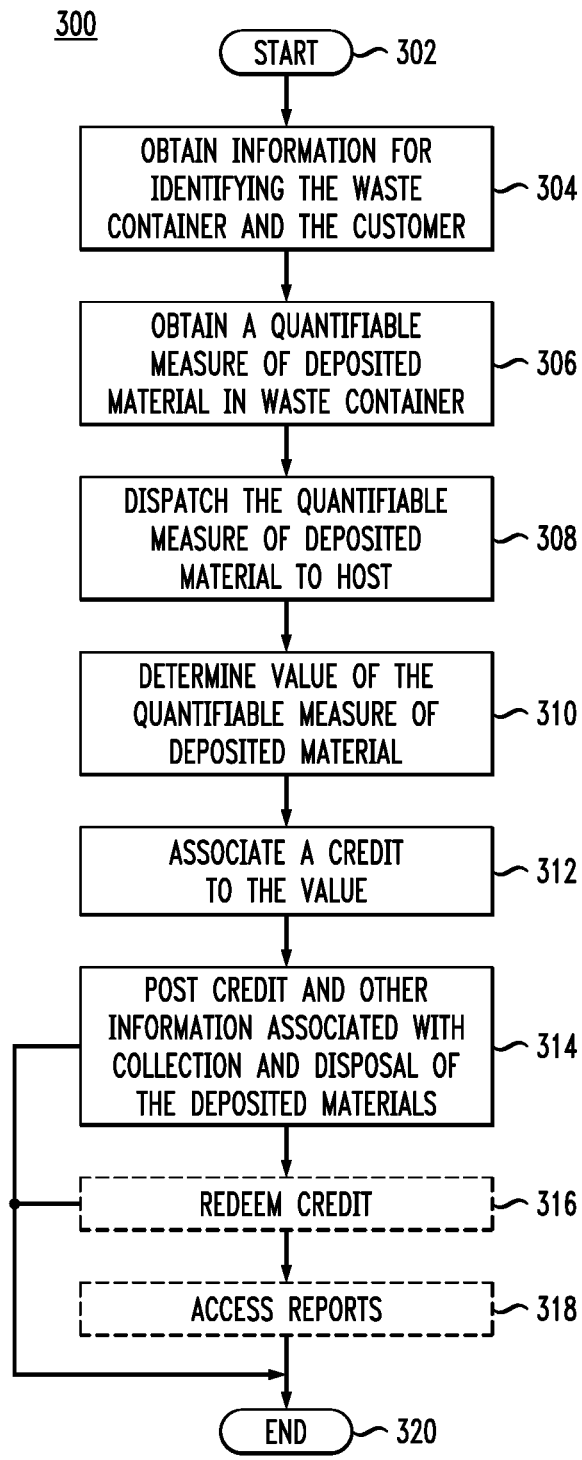
FIG. 3 depicts a method chart for a method of implementing an incentive-based waste reduction system in accordance with one embodiment of the present invention.

Referring now to FIG. 3, a method diagram illustrating an example of a method 300 for providing incentives to reduce waste is shown. For convenience, the method 300 is described with reference to the system 100 of FIG. 1. The method 300, however, may be carried out using other architectures and systems as well.

The method 300 starts at step 302. Prior to step 302, the entity deposits waste material in the waste container 102, and the pickup vehicle 104 is dispatched to and arrives at an address of the entity. At step 304, the data acquisition unit 112 obtains the information for identifying the waste container 102 and the entity information. The data acquisition unit 112 may obtain such information from the identification tag 108. The information from the identification tag 108 may be obtained with or without the entity and/or operator of the pickup vehicle 106 or other person (collectively "operator") interacting with the data acquisition unit 112.

For example, the data acquisition unit 112 may obtain the information from the identification tag 110 automatically using the reader (e.g., a RFID receiver, bar-code reader, magnetic-strip reader, etc.) that is communicatively coupled to the I/O interface of the data acquisition unit 112. To facilitate this, the operator may position the waste container 102, and in turn, the identification tag 108, in a field of view of the reader.

Alternatively, the operator may position the reader so the waste container 102 falls within the field of view of the reader. The reader may be affixed to the pickup vehicle 104 (e.g., attached to the lift 114 or other portion of the vehicle) or removably attached to the pickup vehicle 104 (e.g., a tethered handheld scanner).

As another alternative, the data acquisition unit 112 may obtain the information by having the operator, via the one of the I/O devices (e.g., the keyboard, touchpad, mouse, etc.) enter the identifier associated with the identification tag 108. The data acquisition unit 112 may obtain the information in other ways as well. A At step 306, the data acquisition unit 112 obtains a quantifiable measure of deposited material in waste container 102. To facilitate this, the waste container 102 is positioned or otherwise placed on the load-determining device 110, and the load-determining device 110 receives a trigger, command or other input to cause the load-determining device 110 to determine and transfer the deposited-material measure to the data acquisition unit 112. This may be carried out, as noted above, in any number of ways.

One of these exemplary ways includes positioning the waste container 102 on the lift 114 to which is attached the load-determining device 110, and causing the load-determining device 110 to determine the deposited-material measure as a function of a plurality of weight measurements of the waste container 102 obtained before and after the deposited material is transferred to the pickup vehicle 104 by the lift 114. Alternatively, the load-determining device 110 may, for example, determine the deposited-material measure as a function of a plurality of measurements of quantities of the deposited material in waste container 102 obtained before and after such material is transferred to the pickup vehicle 104 by the lift 114. The load-determining device 110 may determine the deposited-material measure in other ways as well.

After determining the deposited-material measure, the load-determining device 110 transfers the deposited-material measure to the data acquisition unit 112. This may be done in response to a query by the data acquisition unit 112 and/or upon being triggered as a result of a condition, such as in response to one or more manipulations of the I/O device 122 of the data acquisition unit 112 by the operator or other impetus. After transfer, the data acquisition unit 112 stores the deposited-material measure in the deposited-material record $136_j$ for later dispatch to the host 106. The data acquisition unit 112 may obtain the deposited-material measure in other ways as well.

At step 308, the data acquisition unit 112 dispatches the deposited-material measure to the host 106 for further processing. The data acquisition unit 112 may do this, for example, by dispatching the deposited-material record $136_j$ to the host 106. The dispatch may be carried out in response to a query by the host 106 and/or upon being triggered as a result of a condition, such as in response to one or more manipulations of the I/O device 122 of the data acquisition unit 112 by the operator or other impetus. Alternatively, the data acquisition unit 112 may dispatch the deposited-material record $136_j$ on a periodic basis using, for example, a routine for synchronizing and/or replicating the deposited-material record $136_j$ on the host 106.

At step 310, the host 106 uses the host server 138 and application-server software 150 to determine a value associated with the deposited-material measure stored in the deposited-material record $136_j$. To facilitate this, the host server 138 and application-server software 150 first obtain the deposited-material record $136_j$ from the data-acquisition unit 112. The application-server software 150 may obtain the deposited-material record $136_j$ using the routine for synchronizing and/or replicating the deposited-material record $136_j$ on the data-acquisition unit 112. Alternatively, the application-server software 150 may obtain the deposited-material record $136_j$ via an upload over the network 116. The upload may be handled, for example, by a Cold Fusion MX backend executing on the application-server software 150. Using Cold Fusion Markup Language (CFML), the Cold Fusion MX backend parses, where appropriate, and stores the deposited-material record $136_j$ in memory 142.

As noted above, the value associated with the deposited-material measure may be financial (e.g., monetary or economic). For example, the value may be based, at least in part, on an amount of the deposited material. Alternatively, the value may be based, at least in part, upon financial offerings of one or more retailers participating in a rewards program ("participating retailers"). The value may have a minimum and/or a maximum. The maximum may be based on time (e.g., no more than "x" for a given period of time).

In accordance with one embodiment of the present invention, an entity may be allotted an allowable amount of disposable material—that is, all types of disposable material, including recyclables, organics, and garbage—over a specified period of time (e.g., a week, two weeks, a month). This allotment may also be determined by the size of the entity and how many waste generating units for which that entity may be accountable. During such time, if the entity produces exactly the allotted amount of disposable material, the entity is assigned a predetermined value associated with the deposited-material measure. If the entity produces less than the allotted amount of disposable material, the entity is assigned a value associated with the deposited-material measure that is more desirable than the value that would have been assigned to the entity if the entity had produced exactly the allotted amount of disposable material.

Conversely, if the entity produces more than the allotted amount of disposable material, the entity is assigned a value associated with the deposited-material measure that is less desirable than the value that would have been assigned to the entity if the entity had produced exactly the allotted amount of disposable material. In some embodiments, an entity may be debited a value correlating to the undesirable amount of disposable material, or a set amount. In such types of embodiments, not only is an incentive present to motivate an entity to reuse and recycle, but a penalty is present in the event the entity does not adequately perform to the incentivized levels.

In accordance with another embodiment of the present invention, the value assigned to an entity associated with the deposited-material measure may be additionally affected by a ratio. Such a ratio may compare a measure of non-reusable material (i.e., garbage) with a measure of reusable material (e.g., recyclable material, organics, compostable material). The ratio may be a ratio of waste material to recyclable material, a ratio of waste material to a total amount of material (i.e., a sum of reusable and non-reusable material), a ratio of reusable material to a total amount of material or any other ratio or comparison feasible in the context of the present invention. Ratios may also be selective based on a particular type of waste material or reusable material. For example, a ratio may be between types of organics in the reusable materials. Any of these ratios may be referred to herein as a "diversion ratio."

In one such embodiment, the value may be adversely affected if the ratio of waste material to reusable material is above a specified value. Conversely, the value may be positively affected if the ratio of waste material to reusable material is below a specified value. Such a ratio may use any base that is feasible in the context of the present invention, including but not limited to weight, mass, volume, and quantity (e.g., articles, countable pieces).

Example 1

An entity receives a recyclable/waste container. Depending on how many units are associated with the entity or the size of entity facility/footprint, environmental footprint, and the like, the municipality determines how much waste the entity should generate. For instance, if the entity is a household, a family a four may generate: 200 pounds of municipal solid waste (msw) per month; 120 lbs of recycling (once a week collection); 60 lbs of post organics/yard waste (collection once a week); and 20 lbs of garbage (bi-monthly collection). If the family generates 200 pounds for the month, the family receive x points. Every 5 pounds below 120 pounds is an extra point. Every 5 pounds above 120 pounds is a deduction in points. If the ratio of garbage to organics and recycling is above 10%, the entity receives a point deduction, and if it is below, then the entity receives an extra bonus.

To facilitate determining the value, the application-server software 150 may employ database software along with a database and algorithms that form one or more models for assigning the value to the deposited-material measure. In a first exemplary embodiment, the value may be assigned by the fact a participant contributed to the waste reduction program in any amount. In another exemplary embodiment, the value may be assigned correlating to the amount a participant threw out in a given period of time. In yet another exemplary embodiment, the value may be assigned contingent upon wasting less than a threshold value, determined by either a community-based average or a participant's own average. In one additional embodiment, the value may be assigned based on whether the participant had a successive pickup period of decreasing amounts of waste.

Alternative exemplary embodiments contemplate combinations of the above, as well as similar predetermined algorithms. The database software in combination with the database and algorithms may provide flexibility in applying different rates for determining the value. These rates may differ based on availability of the financial offerings, the type of entity, geographic area of the entity, and other demographics. The rates may be applied so that the entities receive an optimum incentive to for waste reduction.

At step 312, the application-server software 150 associates a credit to the value. To facilitate determining the credit, the application-server software 150 may employ the database software along with the database and algorithms that form one or more models for determining and associating a credit to the value to the deposited material measure.

At step 314, after the application-server software 150 posts credit to the entity account, the web-server software 152 posts account (and in, turn, the credit) on a web page to allow the entity to access the credit and the other information associated with the waste reduction activities. To facilitate this, the web-server software 152 obtains account, and in turn, the credit and the other information associated with the waste reduction activities, from the application-server software 150. The web-server software 152 may obtain the credit and the other information in response to a query by the web-server software 152 and/or upon being triggered as a result of a condition, such as in response to the application-server software 150 pushing such information to the web-server software 152.

Additionally, step 314 may include the step of providing one or more messages to the entity. These messages may include positive and/or negative reinforcement in connection with recycling, waste disposal, and/or waste reduction activities. For example, in one embodiment, when the amount of waste an entity has discarded decreases from one period to another, a message congratulating the entity may be sent to the entity, containing a message such as, "Congratulations! Your waste output decreased by p % ! Keep up the good work!" where p % is a percentage change over a given period of time. Conversely, in another example, if the amount of waste an entity has discarded increases from one period to the next, a message encouraging the entity to reduce its waste output may be sent to the entity, containing a message such as, "Your waste output increased by p %. Reduce your waste output to earn valuable rewards!"

The messages sent to the entity may contain a waste output assessment for the entity which is based on a group or community average. For example, if an entity's waste output is greater than the average or median of a group's or a community's waste output, a negative message will be generated and sent to the entity as above. Conversely, if an entity's waste output is smaller than the average or median of a group's or a community's waste output, a positive message will be generated and sent to the entity as above.

Such a message may be delivered via any medium or media feasible in the context of the present invention, including but not limited to e-mail, conventional mail (e.g., by the United States Postal Service), SMS, text message, telephone call, any other medium of communication feasible in the context of the present invention, or any combination thereof. These messages may be automatically generated (e.g., by computer-executable code) each time the entity's waste output is assessed.

After step 314, the method 300 may transition to optional steps 316, 318 and/or to process termination block 320. At step 316, the web-server software 152 allows the entity, via the user device 107, to redeem the credit. This may include the web-server software 152 providing a portal to the retailers to allow the entity to redeem the credit (and/or previously accrued credits) at the retailers to obtain goods, services, coupons valued for goods or services, other benefits or discounts, and the like.

The web-server software 152 may also be operable to allow the entity to transform the credit (and/or previously accrued credits) into one or more vouchers that may be spent at the participating retailers or donated to some other entity. To facilitate this, the web-server software 152 allows the entity to (i) order the vouchers for delivery by mail, email or other communication medium; and/or (ii) provide information to the entity via the user device 107 to allow the entity to print or otherwise reduce to physical form, store it on the user device 107 or a peripheral device coupled to the user device 107.

At optional step 318, the web-server software 152 provides the entity with access to one or more reports, which are formed as a function of the credit and the other information associated with the waste reduction activities (collectively "report data").

The reports may include one or more reports that report data at an entity, street, neighborhood, community, township, county, city or state level. The reports may include reports that report participation rates and averages, and waste disposal rates and averages. As noted above, the report data and reports may be used to enhance collection routing and efficiency, and target community outreach. The report data and reports enable municipalities, private haulers, contractors, environmental consultants and governmental officials to understand when and where the waste removal fleet should go, and to determine truck capacity for routes, and frequency of collection. The report data and reports enable municipalities, private haulers, environmental consultants, academics and government officials to perform community outreach and to measure the effectiveness of community outreach and waste reduction education efforts.

Examples of the reports include, but are not limited by, a Single User Report, a Full User Report, a Single Vendor Report, a Vendor Report, a Vendor Report (Graph), a Monthly Overview Report, a Monthly Route Overview Report, a Hauler Overview Report, an Analysis of Waste Reduction and Participation Rates Report, and a Daily Report of Rewards Ordered Report.

At step 320, the method 300 terminates. Alternatively, the method 300 may be repeated periodically, in continuous fashion, or upon being triggered as a result of a condition, such as obtaining another quantifiable measure of deposited material in waste container 102. As another alternative, the method 300 may be repeated for a multiple of entities.

Although the foregoing describes using the host 106 and/or user device 107 to carry out steps 314-316 electronically, such steps may be carried out using hard copy documents mailed to the entity (for example, the reports, such as monthly account statements, can be mailed to the entity). The hardcopy documents may be carried out in lieu of or in addition to carrying out the steps 314-316 electronically. Further, it is noted that location of the entity associated with waste container 102 can garnered using a positioning receiver of a global positioning system or other type navigation system. This positioning receiver may be affixed to or removably attached to the pickup vehicle 102 and/or the waste container 102.

Figure 4:
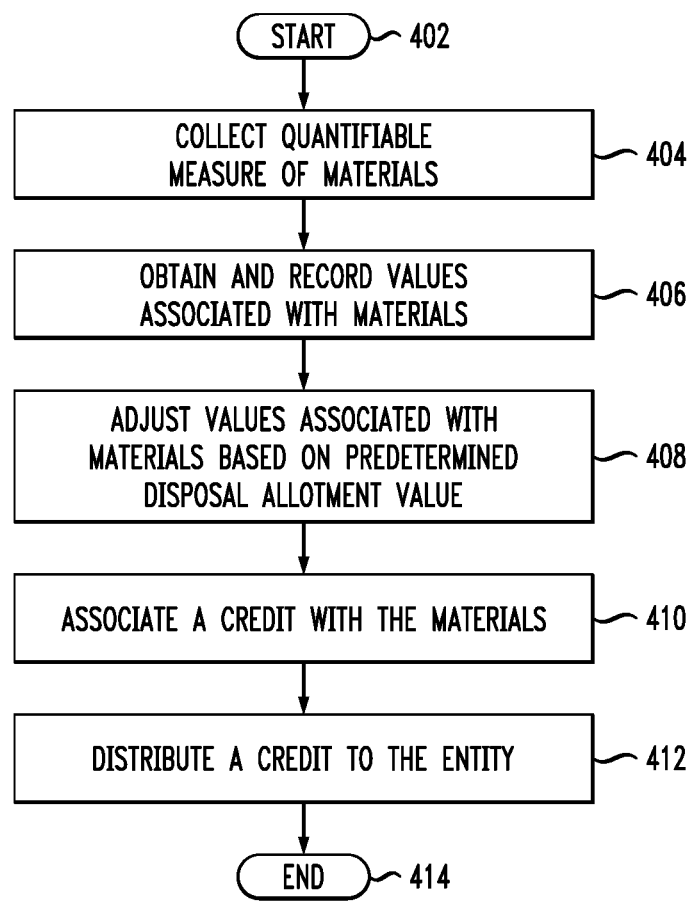
FIG. 4 depicts a method chart for a method of implementing an incentive-based waste reduction system in accordance with one embodiment of the present invention.

Alternatively, a method may be implemented as depicted by the method 400 in FIG. 4. The method 400 begins at step 402. At step 404, a quantifiable measure of a deposited waste material may be collected by any means, including but not limited to by way of a pickup vehicle as described hereinabove with reference to the method 300 and the system 100.

At step 406, one or more values associated with the quantifiable measure of a deposited waste material may be obtained and recorded, such as by way of a load-determining device 110 and/or a data acquisition unit 112. These one or more values may include but are not limited to weight, mass, volume, any other property feasible in the context of the present invention, or any combination thereof. One or more of these values may be recorded, as described hereinabove, using a database or like system on a host system, or may be recorded in the conventional manual manner (e.g., pen and paper).

At step 408, one or more values associated with the quantifiable measure of a deposited waste material may be adjusted based on a predetermined disposal allotment value. The adjustment may take place as described hereinabove, wherein an entity that disposes more than its predetermined disposal allotment value allows is penalized by decreasing the desirability of one or more values associated with the quantifiable measure of a deposited waste material, and conversely, wherein an entity that disposes less than its predetermined disposal allotment value allows is rewarded by increasing the desirability of one or more values associated with the quantifiable measure of a deposited waste material. In this manner, the entity is discouraged from disposing of material which will eventually end up in a landfill or other waste processing facility, and conversely rewarded for decreasing its waste output, thus encouraging eco-friendly consumer behavior.

At step 410, a credit may be associated with one or more values associated with the quantifiable measure of a deposited waste material. For example, a positive credit may be associated with an entity which disposed of less material than its predetermined disposal allotment value. Conversely, a negative credit or a less-desirable positive credit may be associated with an entity which disposed of more material than its predetermined disposal allotment value. Such credit may be financial in nature (e.g., coupons, scrip, cash), may be of token value which may be redeemable for financial rewards (e.g., "points," tokens), of any other value or worth feasible in the context of the present invention, or any combination thereof.

At step 412, one or more of the credits from step 410 may be distributed to an entity. The distribution of these credits may be accomplished through a number of means, including but not limited to electronic distribution (e.g., printable token sent via e-mail, accumulation of virtual units in an online account), physical distribution (e.g., via conventional mail (USPS, etc.), via hand delivery), via any distribution means feasible in the context of the present invention, or any combination thereof.

After the distribution step 412, the method 400 may terminate at step 414. Alternatively, the method 400 may be repeated periodically, in continuous fashion, or upon being triggered as a result of a condition, such as obtaining another quantifiable measure of deposited material in waste container 102. As another alternative, the method 400 may be repeated for a multiple of entities.

Additionally, in accordance with one embodiment of the present invention, an optional step may be implemented after the distribution step 412 in which one or more rewards may be distributed to an entity. The rewards may be financial in nature, material in nature (i.e., a prize), may be of direct economic value, of any other worth or value feasible in the context of the present invention, or any combination thereof. One or more rewards distributed in this manner may be distributed in exchange for one or more credits, as in a redemption process.

In accordance with yet another embodiment of the present invention, such a method 400 may further comprise the step of generating of one or more reports. These reports may comprise one or more data relating to one or more entities, including such data as account information (which may include entities' personal information, including but not limited to name, address, and telephone number), information relating to credits, information relating to rewards, raw measurement data, any other data feasible in the context of the present invention, or any combination thereof.

Figure 5:
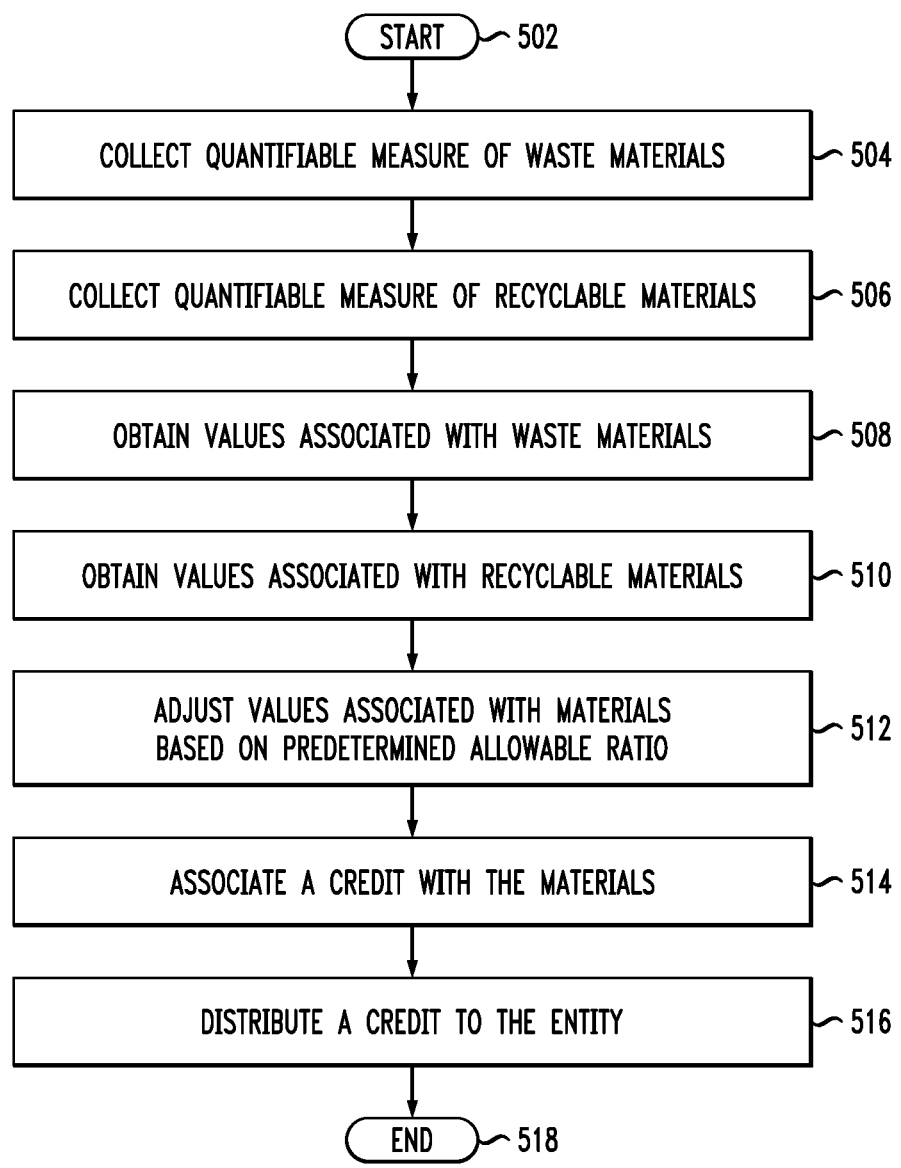
FIG. 5 depicts a method chart for a method of implementing an incentive-based diversion system in accordance with yet another embodiment of the present invention.

FIG. 5 depicts another method in accordance with yet another embodiment of the present invention. The method 500 may begin at step 502. At step 504, a quantifiable measure of a deposited waste material associated with an entity is collected. A quantifiable measure of a deposited waste material may comprise any material as described hereinabove with reference to other embodiments of the present invention, and may be collected in any manner as described hereinabove.

At step 506, a quantifiable measure of a deposited recyclable material associated with an entity is collected. A quantifiable measure of a deposited recyclable material may comprise any material as described as recyclable or reusable hereinabove with reference to other embodiments of the present invention, and may be collected in any manner as described hereinabove, which may or may not be a similar or identical manner of collection as used in connection with a quantifiable measure of a deposited waste material. It should also be noted that a quantifiable measure of a deposited waste material and a quantifiable measure of a deposited recyclable material may be deposited in the same or different storage containers or other container, and/or may be mixed or separated, before and/or after collection. After the recyclable collection step 506, the method 500 may proceed to step 508.

At step 508, one or more values associated with the quantifiable measure of a deposited waste material are obtained. Such data acquisition step may be accomplished in a number of manners, including but not limited to obtaining data from a waste container, with or without the use of a data acquisition unit, as described hereinabove with reference to an earlier embodiment of the present invention. One or more of these values may be recorded, as described hereinabove, using a database or like system on a host system, or may be recorded in the conventional manual manner (e.g., pen and paper).

At step 510, one or more values associated with the quantifiable measure of a deposited recyclable material are obtained. Such data acquisition step may be accomplished in the same or similar manner as the data collection step with respect to the waste material, or in a completely different manner altogether. One or more of these values may be recorded, as described hereinabove, using a database or like system on a host system, or may be recorded in the conventional manual manner (e.g., pen and paper).

At step 512, one or more values associated with at least one of the quantifiable measure of a deposited waste material and the quantifiable measure of a deposited recyclable material may be adjusted based on a predetermined diversion ratio. The adjustment of one or more of these values may be based upon one or more values associated with at least one of the quantifiable measure of a deposited waste material and the quantifiable measure of a deposited recyclable material as compared with the predetermined diversion ratio.

In one aspect, the adjustment will negatively impact one of these values if a diversion ratio associated with an entity is less desirable than the predetermined diversion ratio, while in the same or another aspect, the adjustment will positively impact one of these values if a diversion ratio associated with an entity is more desirable than the predetermined diversion ratio. For example, a certain entity may be allowed 10% diversion which, in this instance, is calculated as the mass of a quantifiable measure of a deposited recyclable material divided by the total mass of deposited material. If that entity's diversion ratio is 15% for a given time period, one or more values associated with the entity, such as a credit value, may be augmented by a given amount or percentage. If, however, the same entity's diversion ratio is 8% for a given time period, one or more values associated with the entity, such as a credit value, may be decreased by a given amount or percentage. The given amount or percentage may be proportional to the change from the predetermined diversion ratio, may be proportional to the change from a diversion ratio associated with the entity during a different time period, may be a fixed value, may be based upon the change in one or more diversion ratios associated with one or more other entities from a predetermined diversion ratio, may be based upon the change in one or more diversion ratios associated with one or more other entities during a different time period, may be calculated or derived in any manner feasible in the context of the present invention, or any combination thereof.

At step 514, a credit is associated with one or more values associated with at least one of the quantifiable measure of a deposited waste material and the quantifiable measure of a deposited recyclable material. Such a credit may take the form of any credit described hereinabove with reference to earlier embodiments. After the credit association step 514, the method 500 may proceed to step 516.

At step 516, one or more credits may be distributed to the entity. This credit distribution may be accomplished in any manner as described hereinabove with reference to earlier embodiments. This distribution may also be conducted in exchange for one or more credits, also as described hereinabove.

After the credit distribution step 516, the method 500 may terminate at step 518. Alternatively, the method 500 may be repeated periodically, in continuous fashion, or upon being triggered as a result of a condition, such as obtaining another quantifiable measure of deposited material in waste container 102. As another alternative, the method 500 may be repeated for a multiple of entities.

It should also be noted that the steps of credit redemption and report generation, as described hereinabove with reference to method 400, may also be included in the method 500 without departing from the scope of embodiments of the present invention.

Figure 6:
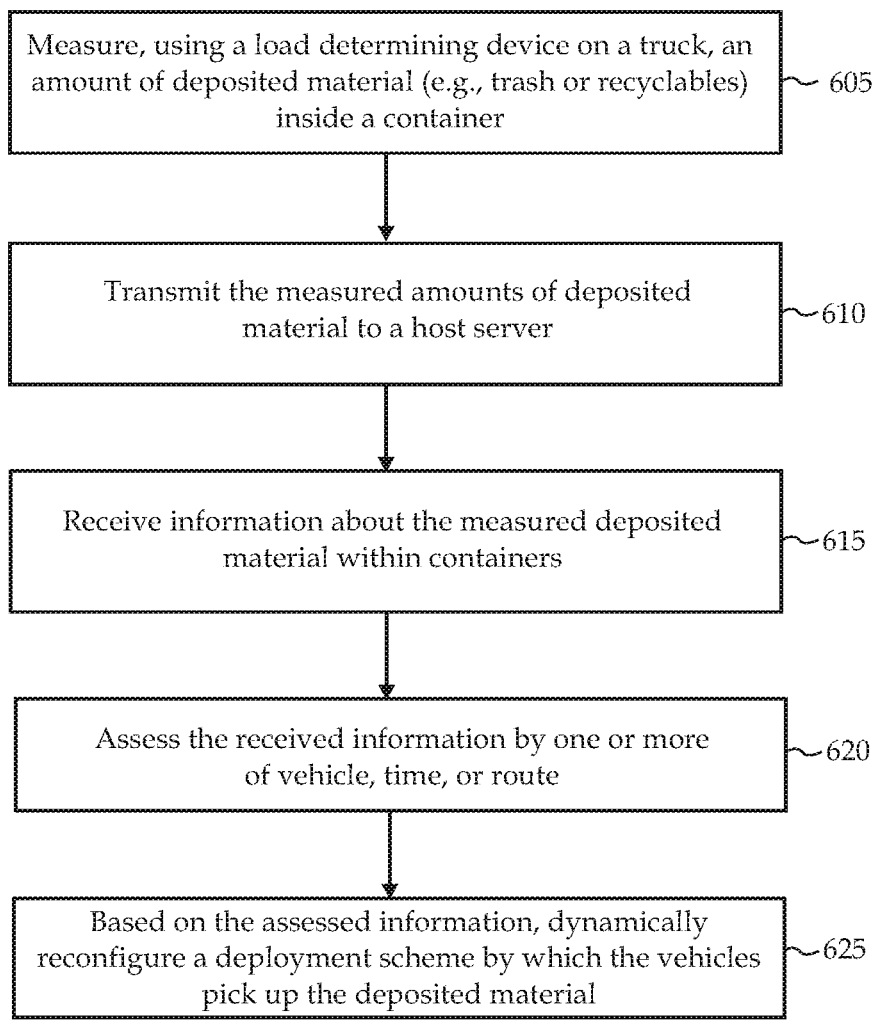
FIG. 6 depicts a method chart in which a deployment scheme for trucks is dynamically reconfigured based on received information about deposited material.

FIG. 6 shows an illustrative method 600 in which a deployment scheme for trucks is dynamically reconfigured based on received and assessed information about deposited material, such as trash and recyclables, inside a waste container 102. In step 605, a deployed truck 104 measures, using a load determining device 110 on the lift 114, an amount of deposited material in a waste container 102. The measured deposited material may be stored, for example, as part of the records 136 stored by the data acquisition unit 112 or other computing device associated with the truck 104.

In step 610, the data acquisition unit 112 associated with the truck transmits at least the measured deposited material, or records, to the host server 138 for processing. The transmitted information can include an address of the pickup location, an identity of the container owner, the composition of the container's contents (e.g., metal recyclables, plastic recyclables, waste, etc.), and the weight of a container measured by the load determining device 110. Such information may be obtained, for example, using a reader that scans a tag affixed to respective containers, as discussed above.

Figure 7:
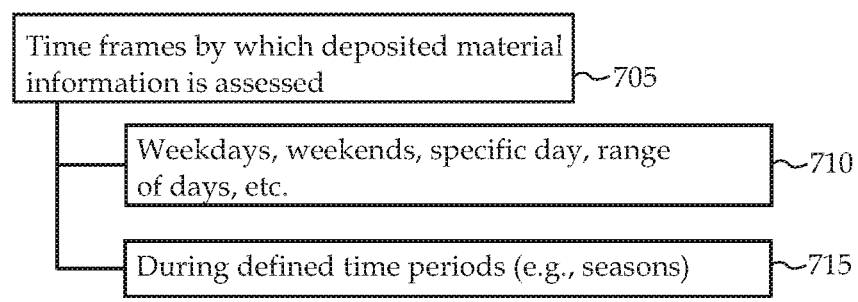
FIG. 7 depicts a taxonomy of time frames by which deposited material information is assessed.
Figure 8:
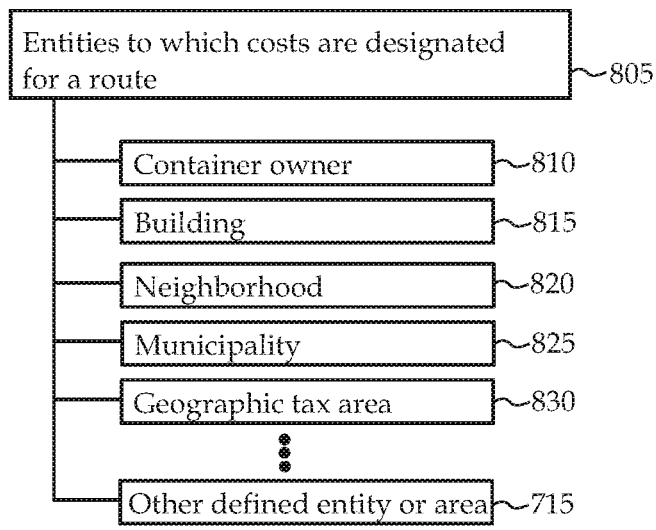
FIG. 8 depicts a taxonomy of entities to which costs are designated for a route.

In step 615, the host server 138 receives the transmitted information about at least the measured deposited material within the containers from the data acquisition unit 112. In step 620, the host server assesses the received information using one or more of vehicle, time, or route as metrics. For example, FIG. 7 shows a taxonomy of time frames by which deposited material information is assessed, as representatively shown by numeral 705. Exemplary and non-exhaustive time frames can include weekdays, weekends, a specific day, range of days, etc. 710 and during defined time periods (e.g., season) 715. FIG. 8 shows a taxonomy of entities to which costs are designated for a route, as representatively shown by numeral 805. Exemplary entities can include a container owner 810, building 815, neighborhood 820, municipality 825, geographic tax area 830, and other defined entities or areas 835.

Referring back to FIG. 6, in step 625, the host server dynamically reconfigures a deployment scheme by which the vehicles pick up the deposited material, such as for future trips. The reconfigured deployment scheme may be determined based on the assessed received information derived from step 620. The reconfigured deployment scheme can include, for example, changing the number of trucks sent on a route, changing the size of the truck sent on a route (e.g., trucks can vary from small to large based on the amount of deposited material to pick up), and the frequency by which vehicles are sent out.

The host server can save and maximize resources by appropriately deploying trucks based on a given situation. For example, a client's monetary resources are saved when an amount of recyclables to be picked up offset the cost associated with disposable trash pickup, and because smaller sized trucks, which typically cost less than larger trucks, can be deployed if the amount of deposited material is minimal. Instead of sending out trucks to only pick up disposable waste, the host server can configure a scheme in which trucks are deployed when one or more clients have sufficient recyclables credited to the customer that can offset the cost of disposable waste. The credit for recyclables and cost for disposable waste can be assessed, for example, using the container's weight obtained by the load determining device and multiplying that weight by a value or cost for the given deposited material.

The disposal company can save natural, personnel, and other resources for deploying resources that are proportional to that which is necessary to pick up the deposited material. That is, an appropriate number of personnel and an appropriately sized truck can be deployed for a given route based on the assessed information. Over time, the host server can develop a plan by which to send trucks based on information obtained in the past. An understanding that, for example, the amount of garbage for pick up tapers off in the winter, or any season, can influence the host server's developed scheme to send out smaller trucks and/or send out trucks at a reduced frequency when the winter approaches.

Figure 9:
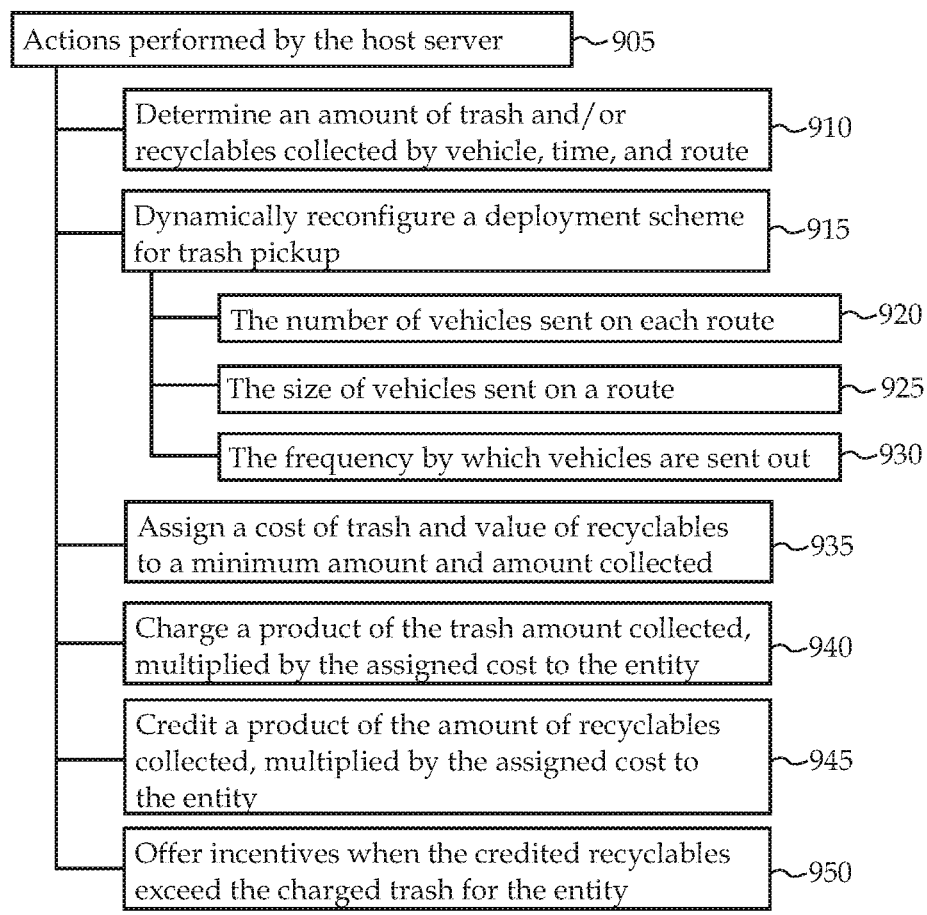
FIG. 9 depicts a taxonomy of actions that may be performed by a host server.

FIG. 9 shows a taxonomy of illustrative actions that may be performed by the host server—such as the dynamic reconfiguration of the deployment scheme discussed above—as illustratively shown by numeral 905. Exemplary actions that the host server can perform include, for example, determine an amount of trash and/or recyclables collected by vehicle, time, and route 910, and dynamically reconfigure a deployment scheme for trash pickup 915, including the number of vehicles sent out on each route 920, the size of vehicles sent on a route 925, and the frequency by which vehicles are sent out 930. Additional actions that the host server can perform include assign a cost of trash and value of recyclables, respectively, to a minimum amount and then to the amount collected 935, charge a product of the trash amount collected which is multiplied by the assigned cost to that entity 940 (FIG. 8), credit a product of the amount of recyclables collected which is multiplied by the assigned cost to the entity 945, and offer incentives when the credited recyclables exceed the charged trash for the entity 950.

The methods 300, 400, and 500 beneficially provide a unique economic incentive for increasing participation rates, as well as for entities to decrease their waste disposal rate. In addition, the methods 300, 400, and 500 may cause households, governments and businesses to receive certain benefits, as are understood in the waste removal industry.

While the foregoing is directed to embodiments of the present invention, other and further embodiments of the invention may be devised without departing from the basic scope thereof.

What is claimed is:
1. A method comprising:
receiving, by a server, via a network, from a plurality of data acquisition devices associated with a plurality vehicles, deposit records relating to waste and recyclable material collected by the plurality of vehicles, along a plurality of routes associated with an entity, from a plurality of containers associated with a plurality of units managed by the entity,
wherein each deposit record is associated with:
a unit selected from the plurality of units;

one or more containers associated with the unit and selected from the plurality of containers; and
measured waste and recyclable material data collected from the one or more containers;

determining, by the server, based on the deposit records, an amount of waste collected for the entity by vehicle, time, and route;

determining, by the server, based on the deposit records, an amount of recyclable material collected for the entity by vehicle, time, and route;

determining, by the server, costs associated with the amount of waste collected by the vehicles;

determining, by the server, credits associated with the amount of recyclable material collected by the vehicles;

charging, by the server, the costs to the entity;

crediting, by the server, the credits to the entity;

determining, by the server, that the credits credited to the entity offset the costs charged to the entity; and in response to said determining that the credits offset the costs, reconfiguring, by the server, a route deployment scheme by which the plurality of vehicles collect the waste and recyclable material along the plurality of routes, said reconfiguring comprising modifying one or more of: a number of vehicles associated with a route from the plurality of routes, a size of one or more vehicles associated with the route, and a frequency by which one or more vehicles are sent out on the route.

* * * * *